(12) United States Patent
Potrebic et al.

(10) Patent No.: US 7,277,137 B2
(45) Date of Patent: Oct. 2, 2007

(54) METHOD AND APPARATUS FOR SELECTING AMONG MULTIPLE TUNERS

(75) Inventors: Peter J. Potrebic, Calistoga, CA (US); Geoffrey R Smith, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 419 days.

(21) Appl. No.: 10/997,423

(22) Filed: Nov. 24, 2004

(65) Prior Publication Data

US 2005/0073613 A1 Apr. 7, 2005

Related U.S. Application Data

(63) Continuation of application No. 10/039,225, filed on Jan. 4, 2002, now Pat. No. 6,897,904.

(51) Int. Cl.
*H04N 5/50* (2006.01)

(52) U.S. Cl. ........................................ 348/731; 348/732

(58) Field of Classification Search ........ 348/731–733, 348/565–567, 569; 386/46, 83; *H04N 5/50*
See application file for complete search history.

(56) References Cited

U.S. PATENT DOCUMENTS

| 4,272,784 A | | 6/1981 | Saito et al. |
| 5,608,535 A | * | 3/1997 | Yoshida et al. ............. 386/123 |
| 5,757,441 A | | 5/1998 | Lee et al. |
| 6,188,448 B1 | | 2/2001 | Pauley et al. |
| 2005/0235323 A1 | * | 10/2005 | Ellis et al. .................... 725/58 |

* cited by examiner

*Primary Examiner*—M. Lee
(74) *Attorney, Agent, or Firm*—Lee & Hayes, PLLC

(57) ABSTRACT

A system or method selects among multiple tuners to tune a particular channel. A request is received to tune a first channel. In response to this request, a first tuner is assigned to tune the first channel. A request is received to tune a second channel. If the program tuned by the first tuner is not being recorded, the first tuner is assigned to tune the second channel. If the program tuned by the first tuner is being recorded, the second tuner is assigned to tune the second channel.

21 Claims, 6 Drawing Sheets

METHOD AND APPARATUS FOR SELECTING AMONG MULTIPLE TUNERS

RELATED APPLICATIONS

This application is a Continuation of application Ser. No. 10/039,225, filed Jan. 4, 2002 now U.S. Pat. No. 6,897,904, entitled "Method and Apparatus for Selecting Among Multiple Tuners", and incorporated herein by reference.

TECHNICAL FIELD

This invention relates to selecting among multiple tuners to tune a particular channel.

BACKGROUND OF THE INVENTION

Existing televisions, set top boxes, and other devices that tune broadcast signals contain a single tuner which is capable of tuning one of several different channels contained in a broadcast signal. Since these existing device contain a single tuner, they are not capable of tuning two or more different channels simultaneously (without the help of an external tuning device). Thus, when a user submits a request to change channels, the single tuner is instructed to change to the requested channel. Since there is only one tuner, there is no question as to which tuner will tune the requested channel.

However, with the development of televisions, set top boxes, and other client devices that contain multiple tuners, issues arise regarding which tuner should be used to tune a particular channel when a request to change channels is received. For example, once a particular tuner begins tuning and recording a program, that tuner cannot be used to tune any other channel without stopping the recording process. If a request to change channels is received while a particular channel is being recorded, the system must determine whether the user desires to stop the recording and view the new channel or to continue recording the previous channel while viewing the new channel. Repeatedly prompting the user to select a tuner to tune a particular channel is likely to be frustrating and distracting to the user.

Therefore it is desirable to provide a system that selects among multiple tuners to tune a particular channel in a manner that is least intrusive to the user of the system.

SUMMARY OF THE INVENTION

The systems and methods described herein select among multiple tuners to tune a requested channel. These systems and methods require little or no input from the user as to which tuner should be assigned to tune a particular channel. For example, if a new channel is selected by the user and a tuner is available to tune the new channel, the available tuner is automatically assigned to tune the new channel without requiring any user input or otherwise disrupting the channel selection process.

In a particular embodiment, a request is received to tune a first channel. A first tuner is assigned to tune the first channel. Another request is received to tune a second channel. The first tuner is assigned to tune the second channel if the program tuned by the first tuner is not being recorded. The second tuner is assigned to tune the second channel if the program tuned by the first tuner is being recorded.

Another embodiment receives a request to record a program on a first channel. A first tuner is assigned to tune the first channel. Another request is received to tune a second channel. A determination is made regarding whether the second channel is already being tuned. Another determination is made regarding whether a second tuner is available for tuning. The first tuner is assigned to tune the second channel if the second channel is not already being tuned and the second tuner is not available for tuning. The second tuner is assigned to tune the second channel if the second channel is not already being tuned and the second tuner is available for tuning.

According to one aspect of the invention, the system switches to the tuner assigned to the second channel if the second channel is already being tuned.

BRIEF DESCRIPTION OF THE DRAWINGS

The same reference numerals are used throughout the drawings to reference like components and features.

DETAILED DESCRIPTION

Figure 1:
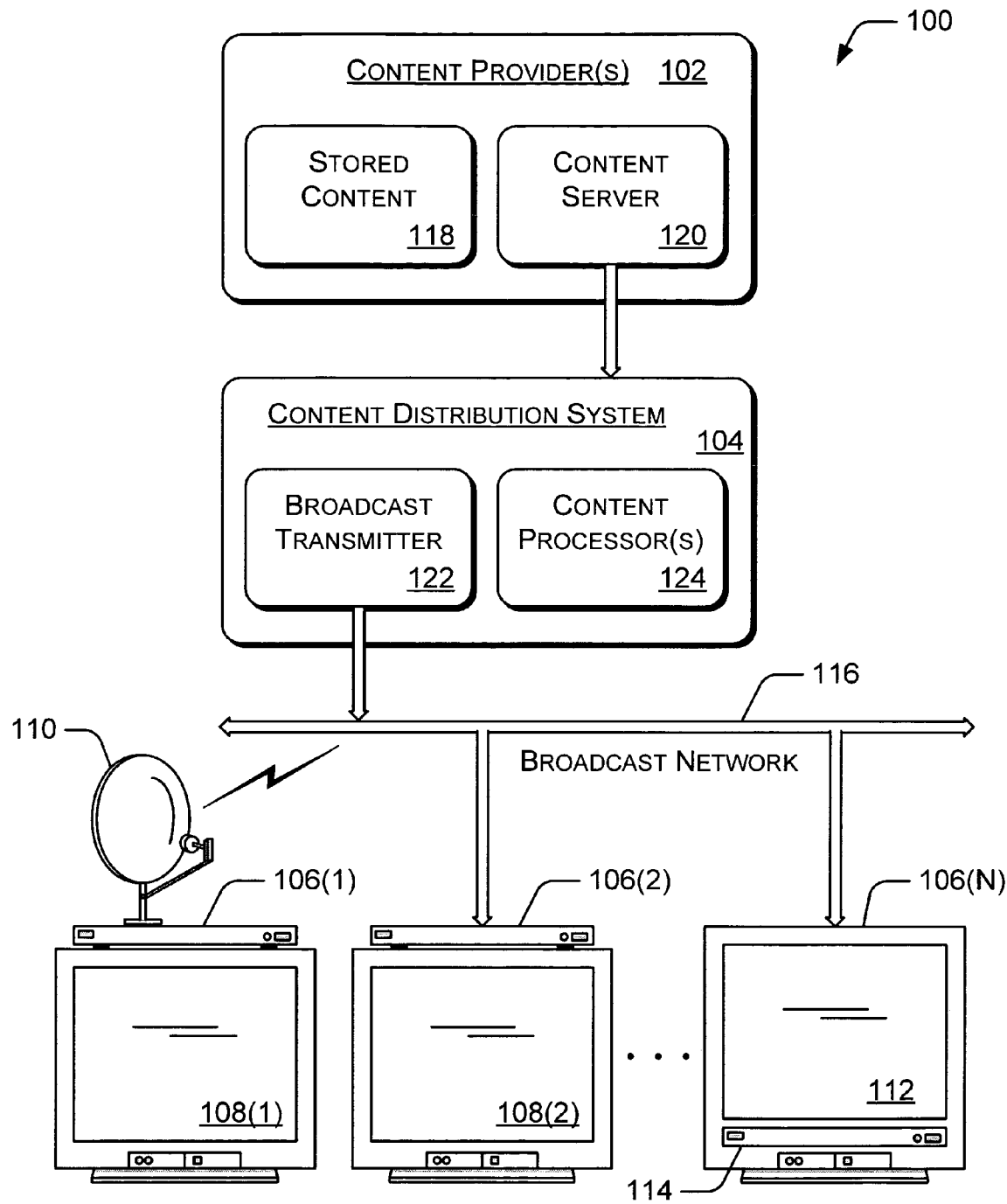
FIG. 1 illustrates an exemplary environment in which the methods and systems described herein may be implemented.

FIG. 1 illustrates an exemplary environment 100 in which the methods and systems described herein may be implemented. One or more content providers 102 include stored content 118 and a content server 120. Content server 120 controls the movement of content (including stored content 118) from the content provider 102 to a content distribution system 104, which is coupled to the content provider. Additionally, the content server 120 controls the movement of live content (e.g., content that was not previously stored by the content provider) and content stored at other locations to the content distribution system.

The content distribution system 104 contains a broadcast transmitter 122 and one or more content processors 124. Broadcast transmitter 122 broadcasts signals (e.g., cable television signals) across a broadcast network 116, such as a cable television network. Broadcast network 116 may include wired or wireless media using any broadcast format or broadcast protocol. Content processor 124 processes the content received from content provider 102 prior to transmitting the content across the broadcast network 116. A particular content processor may encode or otherwise process the received content into a format that is understood by multiple client devices 106 coupled to the broadcast network 116. Although FIG. 1 shows a single content provider 102 and a single content distribution system 104, a particular environment may include any number of content providers coupled to any number of content distribution systems.

A client device 106(1) receives broadcast content from a satellite-based transmitter via a satellite dish 110. Client device 106(1) is also referred to as a set-top box, game console or a satellite receiving device. Client device 106(1) is coupled to a television 108(1) for presenting the content received by the client device (i.e., audio data and video data) as well as a graphical user interface. A particular client device 106 may be coupled to any number of televisions 108. Similarly, any number of client devices 106 may be coupled to a television 108. Another client device 106(2) is coupled to receive broadcast content from broadcast network 116 and provide the received content to a television 108(2). Another client device 106(N) is a combination of a television 112 and a set-top box 114. In this example, the various components and functionality of the set-top box are incorporated into the television, rather than using two separate devices. The set-top box incorporated into the television may receive broadcast signals via a satellite dish (similar to satellite dish 110) and/or via broadcast network 116. In alternate embodiments, client devices 106 may receive broadcast signals via the Internet or any other broadcast medium.

Figure 2:
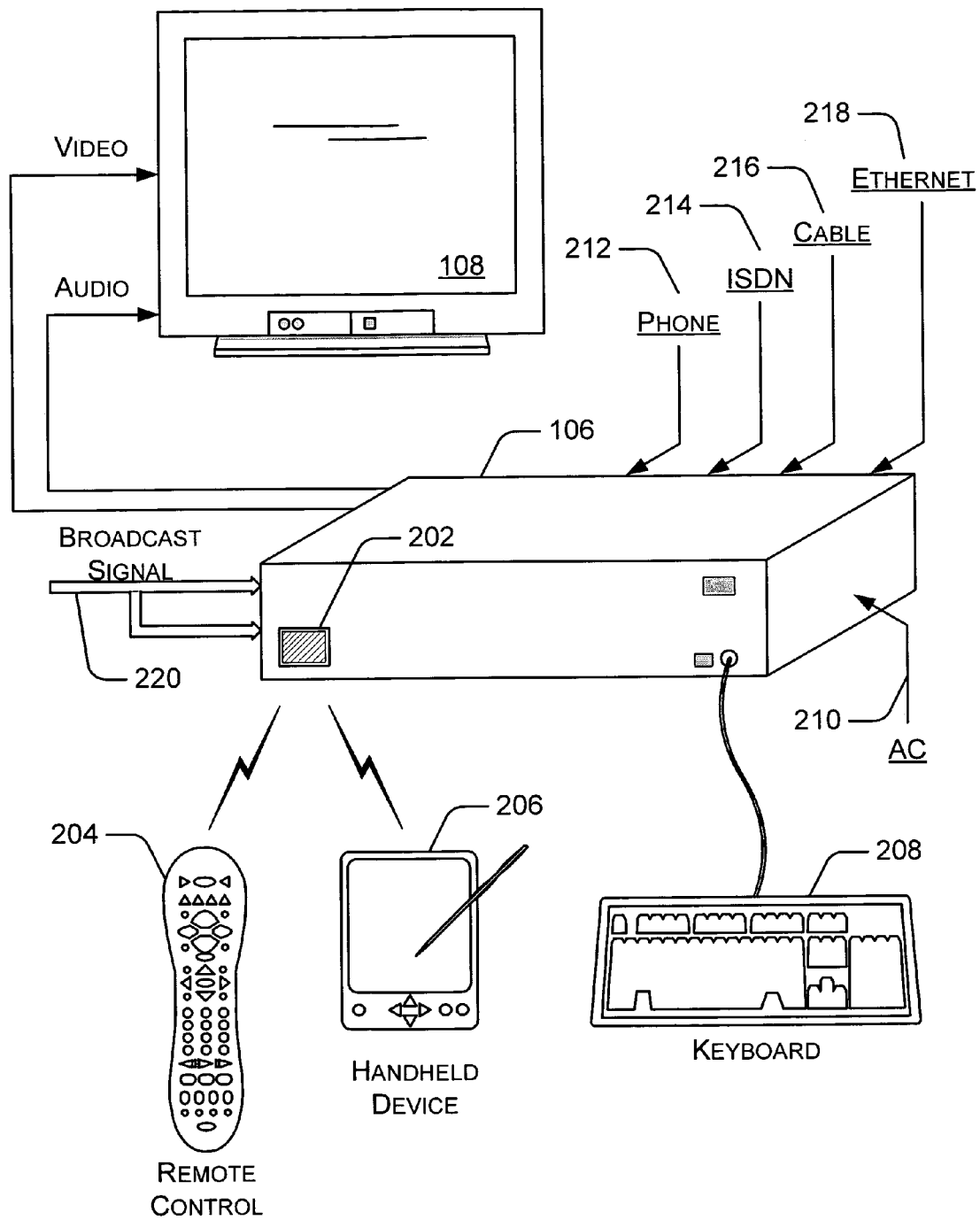
FIG. 2 is a block diagram of an example client device, a television, and various input devices that interact with the client device.

FIG. 2 is a block diagram of an example client device 106, television 108, and various input devices that interact with the client device. As discussed above, client device 106 may also be referred to as a set-top box, a game console or a satellite receiver. Client device 106 includes a wireless receiving port 202 (e.g., an infrared (IR) wireless port) for receiving wireless communications from a remote control device 204, a handheld device 206 (such as a personal digital assistant (PDA) or handheld computer), or other wireless device, such as a wireless keyboard. Additionally, a wired keyboard 208 is coupled to client device 106 for communicating with the client device. In alternate embodiments, remote control device 204, handheld device 206, and/or keyboard 208 may us an RF communication link (or other mode of transmission) to communicate with client device 106.

Client device 106 receives one or more broadcast signals 220 from one or more broadcast sources (e.g., from a broadcast network or via satellite). Client device 106 includes hardware and/or software for receiving and decoding broadcast signal 220, such as an NTSC, PAL, SECAM or other TV system video signal, and providing video data to the television 108. Client device 106 also includes hardware and/or software for providing the user with a graphical user interface by which the user can, for example, access various network services, configure the client device 106, and perform other functions.

Client device 106 receives AC power on line 110. Client device 106 is capable of communicating with other devices via a conventional telephone link 212, an ISDN link 214, a cable link 216, and an Ethernet link 218. A particular client device 106 may use any one or more of the various communication links 212-218 at a particular instant. Client device 106 also generates a video signal and an audio signal, both of which are communicated to television 108. The video signals and audio signals can be communicated form client device 106 to television 108 via an RF (radio frequency) link, S-video link, composite video link, component video link, or other communication link. Although not shown in FIG. 2, a particular client device 106 may include one or more lights or other indicators identifying the current status of the client device. Additionally, a particular client device 106 may include one or more control buttons or switches (not shown) for controlling operation of the client device.

Figure 3:
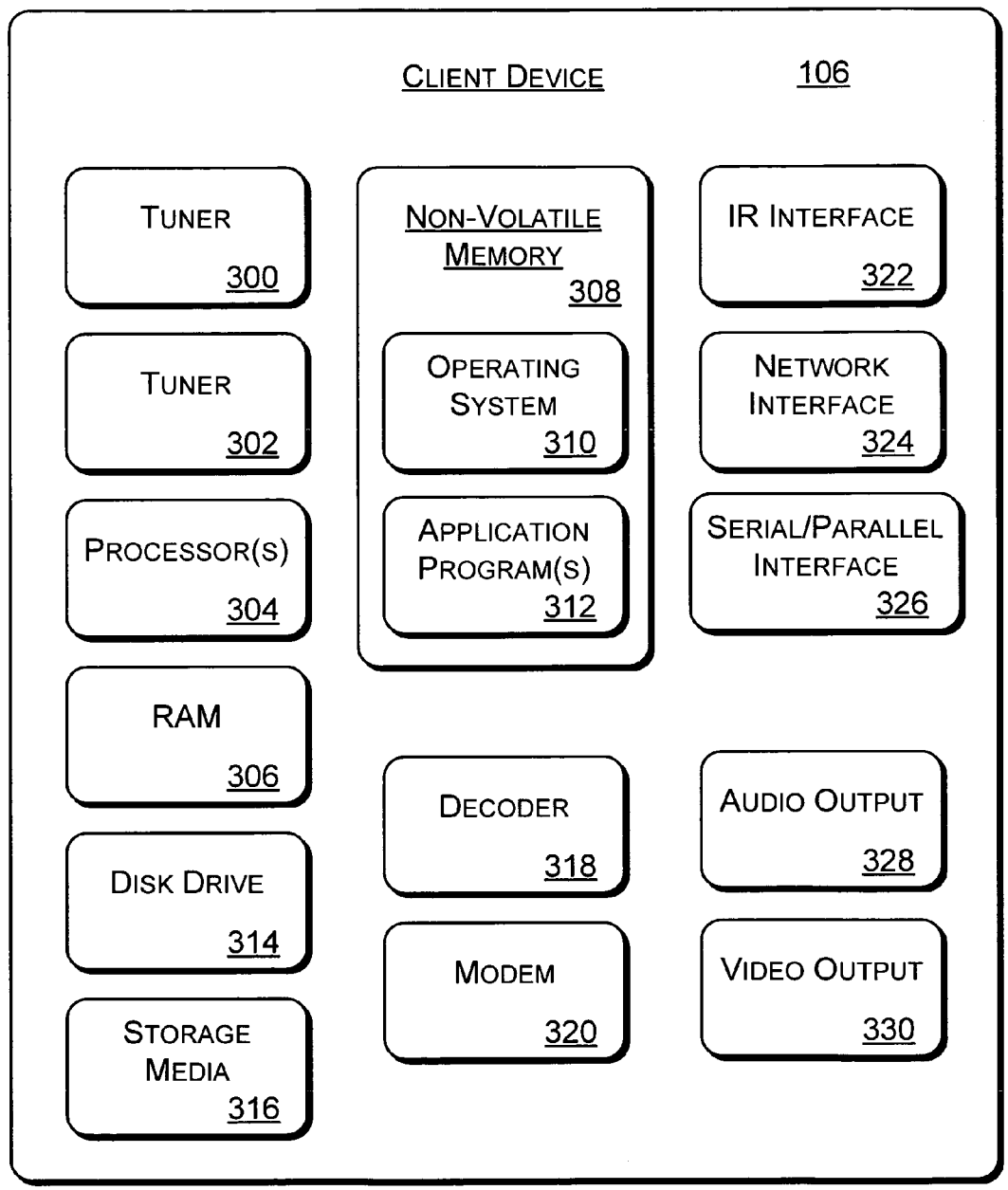
FIG. 3 is a block diagram of selected components of the client device shown in FIGS. 1 and 2.

FIG. 3 is a block diagram of selected components of the client device 106 shown in FIGS. 1 and 2. Client device 106 includes multiple tuners 300 and 302, one or more processors 304, a random access memory (RAM) 306, and a non-volatile memory 308 that contains, for example, an operating system 310 and one or more application programs 312. Client device 106 also includes a disk drive 314 and storage media 316. Although client device 106 is illustrated having both a RAM 306 and a disk drive 314, a particular device may include only one of the memory components. Additionally, although not shown, a system bus typically couples together the various components within client device 106.

Processor(s) 304 process various instructions to control the operation of client device 106 and to communicate with other electronic and computing devices. The memory components (e.g., RAM 306, disk drive 314, storage media 316, and non-volatile memory 308) store various information and/or data such as configuration information and graphical user interface information.

Client device 106 also includes a decoder 318, such as an MPEG-2 decoder that decodes MPEG-2-encoded signals. A modem 320 allows client device 106 to communicate with other devices via a conventional telephone line. An IR interface 322 allows client device 106 to receive input commands and other information from a user-operated device, such as a remote control device or an IR keyboard. Client device 106 also includes a network interface 324, a serial/parallel interface 326, an audio output 328, and a video output 330. Interfaces 324 and 326 allow the client device 106 to interact with other devices via various communication links. Although not shown, client device 106 may also include other types of data communication interfaces to interact with other devices. Audio output 328 and video output 330 provide signals to a television or other device that processes and/or presents the audio and video data. Although client 106 is illustrated having multiple interfaces, a particular client may only include one or two such interfaces.

Client device 106 also includes a user interface (not shown) that allows a user to interact with the client device. The user interface may include indicators and/or a series of buttons, switches, or other selectable controls that are manipulated by a user of the client device.

General reference is made herein to one or more client devices, such as client device 106. As used herein, "client device" means any electronic device having data communications, data storage capabilities, and/or functions to process signals, such as broadcast signals, received from any of a number of different sources.

Figure 4:
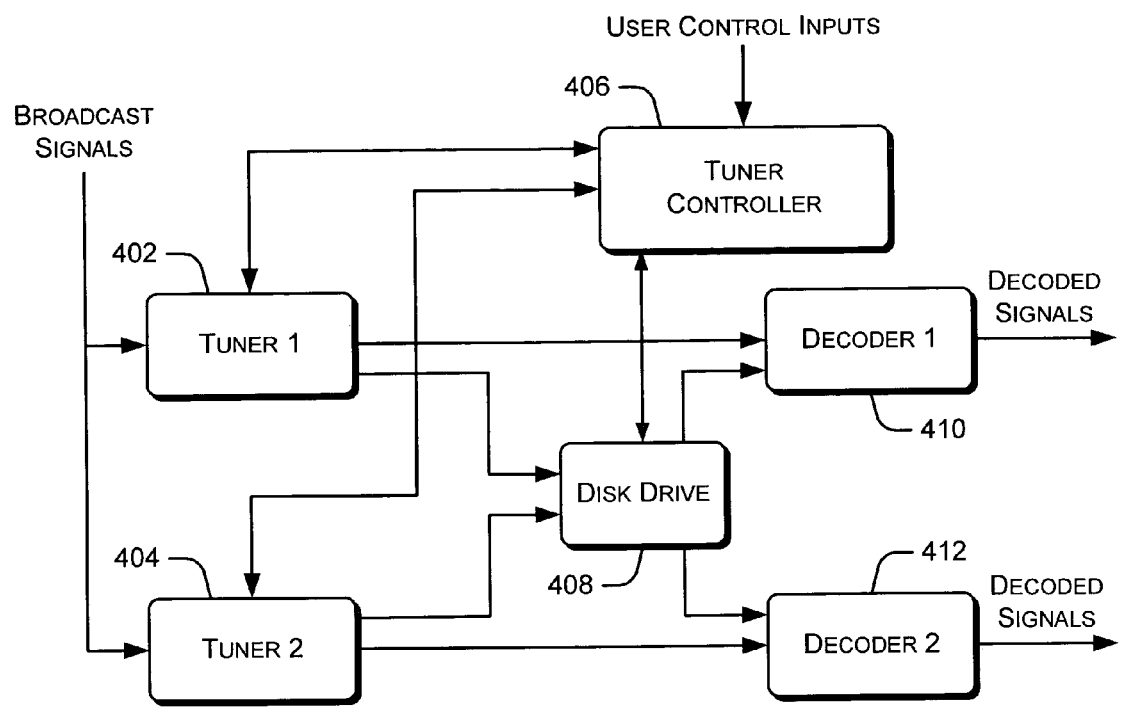
FIG. 4 is a block diagram of an exemplary client device that includes two tuners, a tuner controller, a disk drive, and a pair of decoders.

FIG. 4 is a block diagram of a portion of an exemplary client device that includes two tuners, a tuner controller, a disk drive, and a pair of decoders. The exemplary client device contains additional components (such as those shown in FIG. 3) which are omitted from FIG. 4 to simplify discussion of specific components. A pair of tuners 402 and 404 each receive broadcast signals from a one or more broadcast sources. Certain broadcast signals may include encoded data, such as encoded video data and encoded audio data. In this situation, a decoder is used to decode the encoded data.

In a particular embodiment, the broadcast signals include data encoded using the MPEG-2 (Moving Pictures Experts Group) encoding format. MPEG-2 is a standard for digital video and digital audio compression. MPEG-2 supports a variety of audio/video formats, including legacy TV, HDTV (High-Definition Television), and five channel surround sound. However, the methods and systems described herein can be used with any type of signal using any type of encoding format as well as signals that do not use any encoding.

Referring again to FIG. 4, each tuner 402 and 404 maintains an internal "state". This state information may include, for example, the channel currently being tuned (if any) and whether the tuner is creating a pause buffer (e.g., for "pausing" a live broadcast) or creating an archival recording of the program. Each tuner 402 and 404 is coupled to a tuner controller 406. Tuner controller 406 receives user control inputs, such as a user request to change channels or record a program being broadcast on a particular channel. These user control inputs may be provided through a remote control device, wireless keyboard, or other input device. Tuner controller 406 processes the received user control inputs and sends control instructions, if necessary, to tuner 402 and/or tuner 404. For example, if the user requests to change from viewing channel 204 to channel 206, the tuner controller 406 instructs one of the tuners 402 or 404 to begin tuning channel 206. Additionally, tuners 402 and 404 can communicate information to tuner controller 406, such as the current channel being tuned by the tuner. Although two tuners are illustrated in FIG. 4, a particular implementation may contain any number of tuners.

A disk drive 408 is coupled to tuners 402 and 404, tuner controller 406, and a pair of decoders 410 and 412. Disk drive 408 is capable of storing program data received from tuner 402 and/or 404 and replaying that program data at a later time. Tuner controller 406 controls the recording of programs by sending appropriate commands to disk drive 408. Disk drive 408 may also store other information used by the client device such as configuration information. Disk drive 408 outputs encoded program content to decoder 410 and/or 412. The decoder 410, 412 then decodes the encoded program content and outputs decoded signals, such as decoded video signals and decoded audio signals. Tuners 402 and 404 are also coupled to decoders 410 and 412 and may provide tuned signals directly to decoder 410, 412 if the tuned signal is being watched live (i.e., not being played back from the disk drive 408). Although FIG. 4 illustrates two decoders 410 and 412, alternate embodiments include a single decoder that decodes signals from both tuners 402 and 404, or from disk drive 408.

Alternatively, disk drive 408 may output signals directly (i.e., not through decoder 410, 412) if the program content stored on the disk drive does not require decoding. Similarly, tuners 402, 404 may output signals directly if the program content being tuned does not require decoding.

Figure 5:
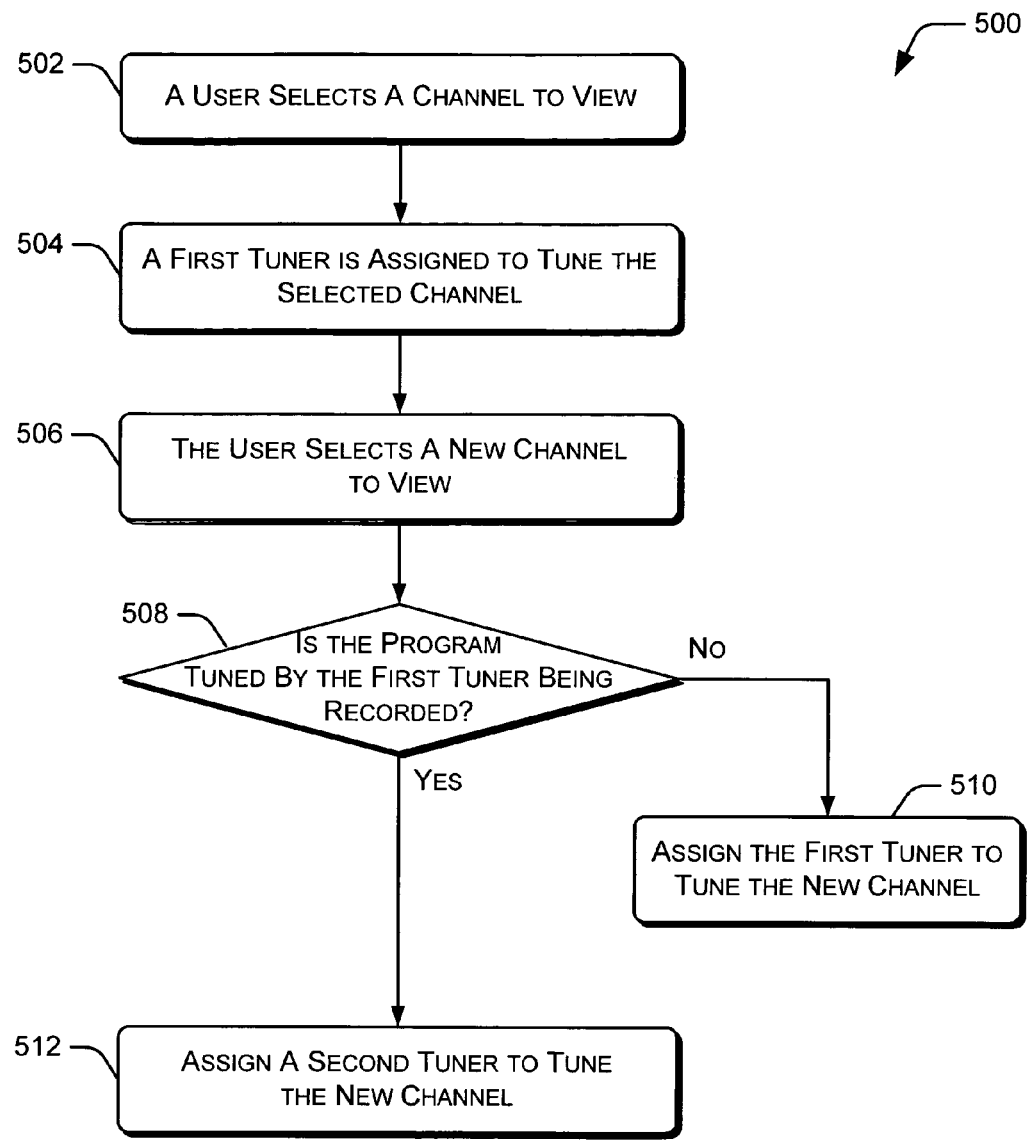
FIG. 5 is a flow diagram illustrating an embodiment of a procedure for determining which tuner to use when a user selects a new channel to view.

FIG. 5 is a flow diagram illustrating an embodiment of a procedure 500 for determining which tuner to use when a user selects a new channel to view. Initially, a user selects a channel to view (block 502). A first tuner is assigned to tune the channel selected by the user (block 504). The user then selects a new channel to view (block 506). The procedure 500 then determines whether the program being tuned by the first tuner is being recorded (block 508). This determination can be performed by querying the state of the first tuner to determine whether the program is being recorded. If the program being tuned by the first tuner is not being recorded, the procedure assigns the first tuner to tune the new channel (block 510). If the program being tuned by the first tuner is being recorded, the procedure assigns a second tuner to tune the new channel (block 512). The manner in which a tuner is selected for the new channel minimizes disruption to the user of the client device. For example, if the client device is already recording a program on one channel, that recording is not disturbed by the user's request to view a different channel. Instead of changing the channel assigned to the tuner that is tuning the recorded channel, a second tuner is used to tune the new channel.

Figure 6:
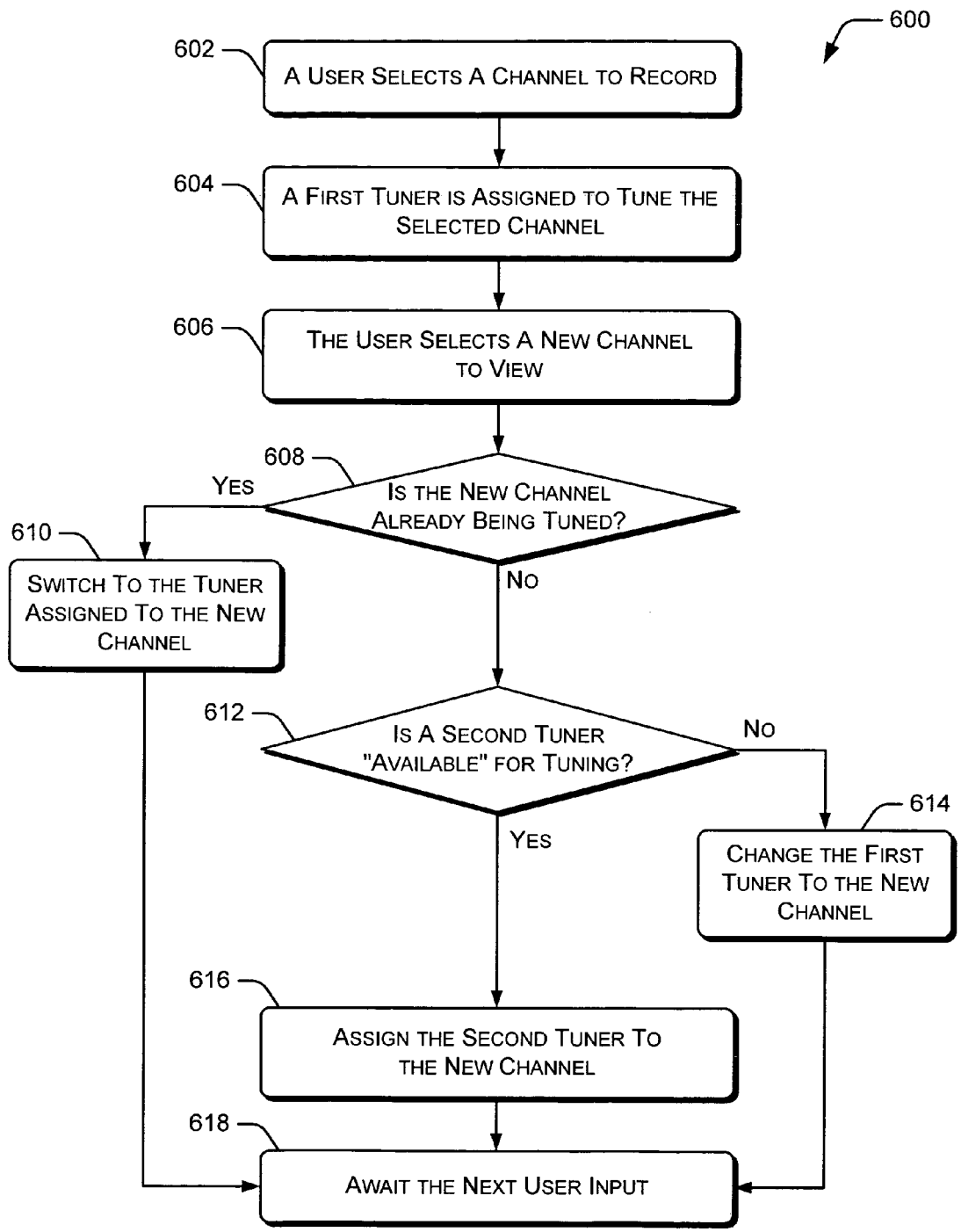
FIG. 6 is a flow diagram illustrating an embodiment of a procedure for determining which tuner to use when one tuner is recording a program and a change channel command is received.

FIG. 6 is a flow diagram illustrating an embodiment of a procedure 600 for determining which tuner to use when one tuner is recording a program and a change channel command is received. Initially, a user selects a channel to record (block 602). A first tuner is assigned to tune the selected channel (block 604). The user then selects a new channel to view (block 606). The procedure 600 then determines whether the new channel is already being tuned by another tuner (block 606). If the new channel is already being tuned by another tuner, then block 610 of the procedure switches to the tuner assigned to the new channel (i.e., the new "active" tuner is the tuner that was already tuning the newly selected channel). The procedure then awaits the next user input (block 618). If the "new channel" was being recorded, the user is provided with a graphical indication on the television screen and/or an audible sound indicating that the program is being recorded.

By checking to see if the requested channel is already being tuned by another tuner, the system maintains the highest number of available tuners and avoids the situation where one tuner is recording a program from a particular channel and another tuner is being used to tune and display the program from the same channel. Also, by switching back to a tuner that is tuning and recording the requested channel, the user has access to the previously recorded program content. Certain systems empty the "pause buffer" (i.e., recorded portions of the program) in response to a channel change. If a new tuner was used to tune and display the selected channel, the previously recorded portions of the program would not be available to the user. However, by switching control to the tuner already recording the content, the user has access to the recorded content.

When switching back to a channel that is being recorded, the system can begin displaying the program content currently being tuned by the tuner. Alternatively, the system can begin displaying previously recorded program content, such as playing back the recorded program starting at the beginning of the program or playing back the recorded program from the point at which the user previously changed channels (i.e., switched away from the recorded program).

Referring again to FIG. 6, if the new channel selected at block 606 is not already being tuned by another tuner, the procedure 600 determines whether a second tuner is "available" for tuning the new channel (block 612). An "available" tuner as used herein may be defined in several different ways. An "available" tuner may be idle or may be engaged in a task that has a lower priority than the priority of allowing a user to change a channel being viewed. For example, using the tuner to receive non-urgent data may be a lower priority than changing a viewed channel, but using the tuner to record a second program may be a higher priority than changing a viewed channel. One tuner can determine whether another tuner is available by querying the other tuner to determine its status and priority.

If a second tuner is not available for tuning the new channel, then the procedure changes the first tuner to the new channel (block 614). The procedure then awaits the next user input (block 618). If a second tuner is available for tuning the new channel, then the procedure assigns the second tuner to the new channel (block 616). The procedure then awaits the next user input (block 618).

In a particular embodiment, recorded program content is associated with the tuner that originally tuned the recorded program. When a first tuner is tuning program content that is being recorded and a problem occurs with the first tuner or a higher priority task is assigned to the first tuner, a new tuner is selected to tune the program. In this situation, the recorded program content may be changed such that the recorded program content is associated with the new tuner. Thus, the user is still able to view the previously recorded program content (tuned by the first tuner) even though the first tuner is no longer available. For example, if the first tuner malfunctions or the signal line providing broadcast signals to the first tuner is damaged, the tuning operation is switched to a second tuner and the previously recorded program content is modified to be associated with the new tuner. Alternatively, the program content tuned by the second tuner may be stored as a separate file that is "linked" to the previously recorded program content. By linking the two files, the user is able to easily access the entire recorded program content even though the program content is saved in two different files.

In one embodiment, one or more user interface features are provided that indicate to the user that, upon switching back to a channel that is being recorded, the user is now watching a recorded show. This indication reassures the user that their recording is proceeding properly. This indication also reminds the user that they have the ability to access previously recorded portions of the program, if desired.

Portions of the systems and methods described herein may be implemented in hardware or a combination of hardware, software, and/or firmware. For example, one or more application specific integrated circuits (ASICs) or programmable logic devices (PLDs) could be designed or programmed to implement one or more portions of the systems and procedures described herein.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An apparatus comprising:
means for receiving a request to tune a first channel;
means for assigning a first tuner to tune the first channel;
means for receiving a request to tune a second channel;
means for assigning the first tuner to tune the second channel if the program tuned by the first tuner is not being recorded; and
means for assigning a second tuner to tune the second channel if the program tuned by the first tuner is being recorded, wherein the means for assigning a second tuner to tune the second channel includes means for determining whether a second tuner is available for tuning, wherein the means for determining whether a second tuner is available for tuning includes the first tuner querying the second tuner.

2. An apparatus comprising:
means for receiving a request to tune a particular channel;
means for determining whether a second tuner is available for tuning, wherein the means for determining whether a second tuner is available for tuning includes the first tuner querying the second tuner;
means for assigning a first tuner to tune the particular channel if the program currently tuned by the first tuner is not being recorded; and
means for assigning the second tuner to tune the second channel if the second tuner is available for tuning and the program currently tuned by the first tuner is being recorded.

3. An apparatus as recited in claim 2, wherein the means for assigning the first tuner further assigns the first tuner to tune the particular channel if the second tuner is not available for tuning.

4. An apparatus as recited in claim 2, further comprising means for assigning a third tuner to tune the particular channel if the first tuner and the second tuner are not available to tune the particular channel.

5. One or more computer-readable media having stored thereon a computer program that, when executed by one or more processors, causes the one or more processors to:
receive a request to tune a particular channel;
determine whether a second tuner is available for tuning, wherein the one or more processors determine whether a second tuner is available for tuning by having the first tuner query the second tuner;
assign a first tuner to tune the particular channel if the program currently tuned by the first tuner is not being recorded; and
assign the second tuner to tune the second channel if the second tuner is available for tuning and the program currently tuned by the first tuner is being recorded.

6. One or more computer-readable media as recited in claim 5, wherein the one or more processors further assign the first tuner to tune the particular channel if the second tuner is not available for tuning.

7. One or more computer-readable media as recited in claim 5, wherein the one or more processors further assign a third tuner to tune the particular channel if the first tuner and the second tuner are not available to tune the particular channel.

8. One or more computer-readable media having stored thereon a computer program that, when executed by one or more processors, causes the one or more processors to:
receive a request to record a program on a first channel;
assign a first tuner to tune the first channel;
receive a request to tune a second channel;
assign a second tuner to tune the second channel if the second tuner is available for tuning, wherein determining whether a second tuner is available for tuning includes the first tuner querying the second tuner;
receive a request to tune the first channel;
switch to the first tuner; and
display an indicator that the user is now watching a recorded program.

9. One or more computer-readable media as recited in claim 8, wherein the recorded program data from the first channel is associated with the first tuner.

10. One or more computer-readable media as recited in claim 8, wherein the one or more processors further change the status of the second tuner to an available state.

11. One or more computer-readable media as recited in claim 8, wherein the one or more processors further assign the second tuner to tune the first channel if the first tuner is not available to tune the first channel.

12. One or more computer-readable media as recited in claim 11, wherein the wherein the one or more processors further modify the recorded program data associated with the first tuner to be associated with the second tuner if the first tuner is not available to tune the first channel.

13. One or more computer-readable media as recited in claim 11, wherein the one or more processors further generate a new set of recorded program data and associate the new set of recorded program data with the second tuner.

14. One or more computer-readable media as recited in claim 8, wherein when the one or more processors further display the program content currently being tuned by the first tuner.

15. One or more computer-readable media as recited in claim 8, wherein the one or more processors further display previously recorded program content if the first tuner has been recording the tuned content.

16. A system comprising:
a memory device; and
a processor coupled to the memory device, wherein the processor is configured to:
  receive a request to tune a particular channel;
  determine whether a second tuner is available for tuning, wherein the processor determines whether a second tuner is available for tuning by having the first tuner query the second tuner;
  assign a first tuner to tune the particular channel if the program currently tuned by the first tuner is not being recorded; and
  assign the second tuner to tune the second channel if the second tuner is available for tuning and the program currently tuned by the first tuner is being recorded.

17. A system as recited in claim 16, wherein the processor is further configured to assign the first tuner to tune the particular channel if the second tuner is not available for tuning.

18. A system as recited in claim 16, wherein the processor is further configured to assign a third tuner to tune the particular channel if the first tuner and the second tuner are not available to tune the particular channel.

19. A system comprising:
a memory device; and
a processor coupled to the memory device, wherein the processor is configured to:
  receive a request to record a program on a first channel;
  assign a first tuner to tune the first channel;
  receive a request to tune a second channel;
  determine whether the second channel is already being tuned;
  determine whether a second tuner is available for tuning, wherein the processor determines whether a second tuner is available for tuning by querying the second tuner to determine the status of the second tuner;
  assign the first tuner to tune the second channel if the second channel is not already being tuned and the second tuner is not available for tuning; and
  assign the second tuner to tune the second channel if the second channel is not already being tuned and the second tuner is available for tuning.

20. A system as recited in claim 19, wherein the processor is further configured to switch to the tuner assigned to the second channel if the second channel is already being tuned.

21. A system as recited in claim 19, wherein the processor is further configured to assign a third tuner to tune the first channel if the first tuner is not available to tune the first channel.

* * * * *